United States Patent [19]

Park

[11] Patent Number: 5,135,182
[45] Date of Patent: Aug. 4, 1992

[54] SEAT BELT WINDING FORCE CONTROLLING DEVICE

[76] Inventor: Sa Ryong Park, Kaep Chugong Apt., 706-105 Kaepo-Dong, Kangnam-Ku, Seoul, Rep. of Korea

[21] Appl. No.: 544,234

[22] Filed: Jun. 26, 1990

[51] Int. Cl.⁵ .................. B60R 22/38; B60R 22/44
[52] U.S. Cl. .................. 242/107.4 B; 242/107.6
[58] Field of Search ............... 242/107.4 B, 107.4 A, 242/107.6, 107.7; 280/806, 807

[56] References Cited

U.S. PATENT DOCUMENTS

| | | | |
|---|---|---|---|
| 4,261,531 | 4/1981 | Naitoh | 242/107.6 |
| 4,293,106 | 10/1981 | Standing | 242/107.4 B X |
| 4,566,650 | 1/1986 | Morinaga | 242/107.6 X |
| 4,651,947 | 3/1987 | Tsukamoto | 242/107.6 X |
| 4,684,077 | 8/1987 | Kurtti | 242/107.6 |
| 4,723,728 | 2/1988 | Kanada | 242/107.6 |

Primary Examiner—John M. Jillions
Attorney, Agent, or Firm—Birch, Stewart, Kolasch & Birch

[57] ABSTRACT

A seat belt winding force controlling device for vehicles includes a main body, a belt reel, a shaft, a braking lever, a windup spring, an emergency braking member, a ratchet gear, and a winding force controlling member, whereby the winding force can be easily locked and released by snatching within the range in which the wearer does not feel confined.

15 Claims, 10 Drawing Sheets

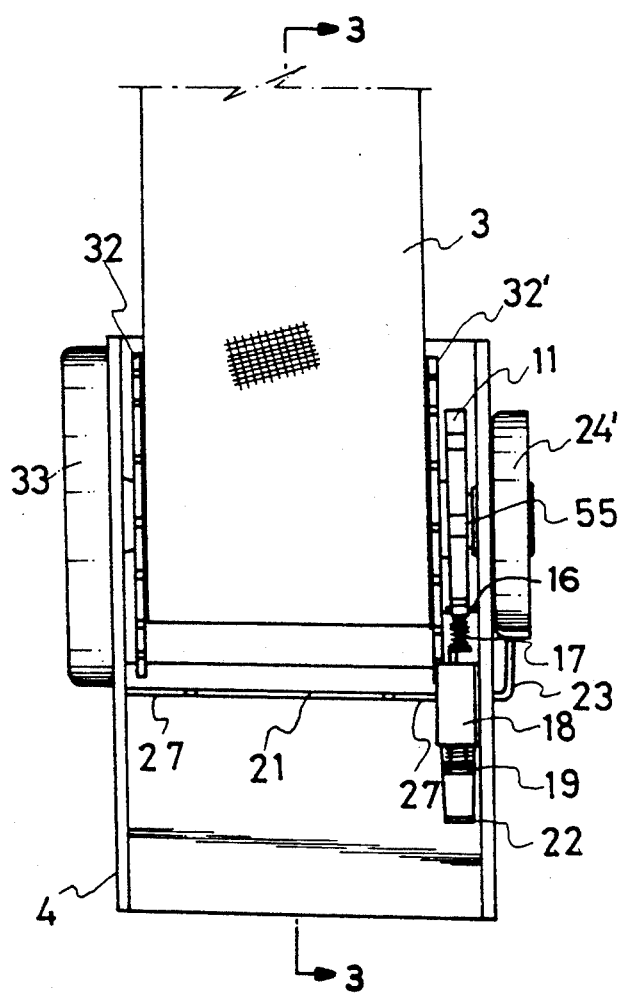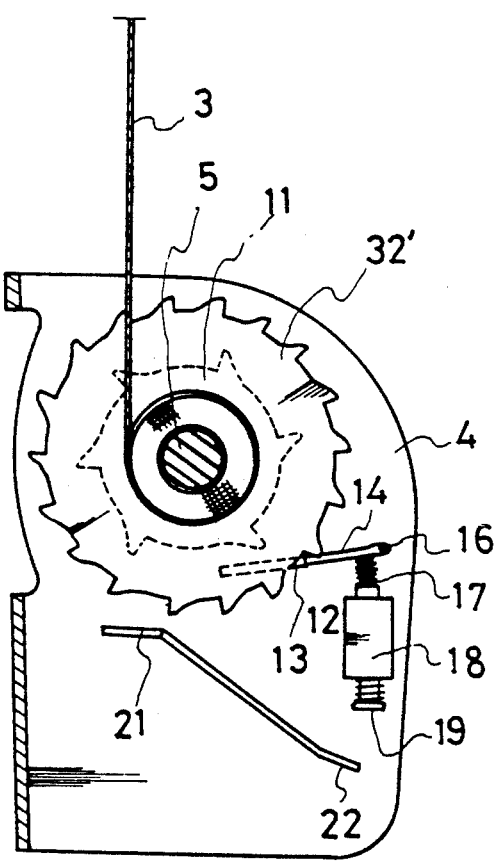

FIG. 8
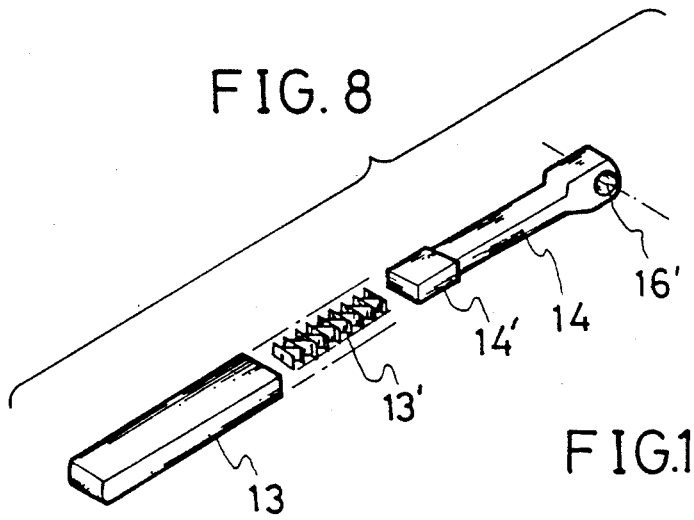
FIG. 13
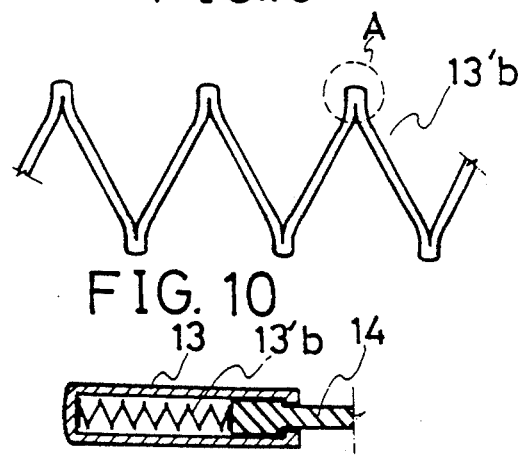
FIG. 9
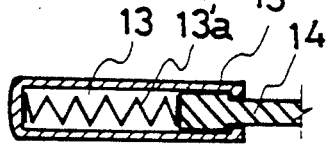
FIG. 10
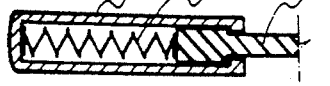
FIG. 11
FIG. 12
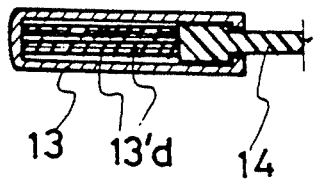

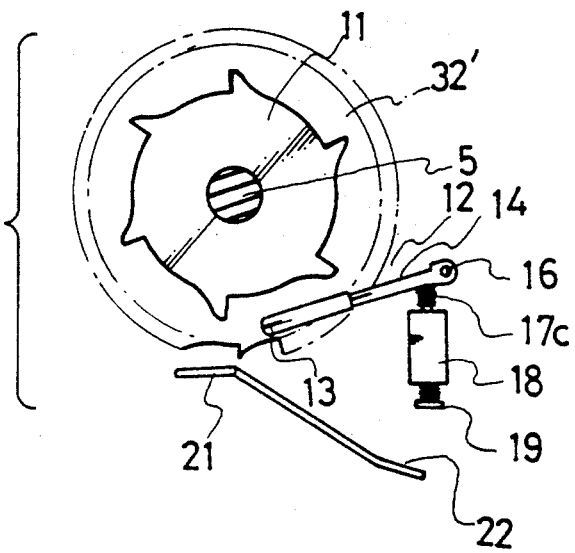
FIG. 20(A)
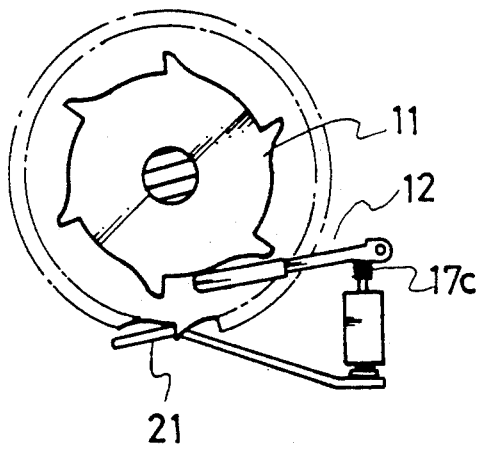
FIG. 20(B)
FIG. 20(C)

SEAT BELT WINDING FORCE CONTROLLING DEVICE

BACKGROUND OF THE INVENTION

1. Field of the Invention

The present invention relates to a seat belt winding force control device for use in a vehicle. More particularly, the present invention relates to an improvement in the retractor of a seat belt provided with a controlling member to brake the seat belt winding force.

2. Description of the Prior Art

Various types of seat belt retractors are well known in the art. Such seat belt retractors utilize an emergency brake to be operated by the wearer for retracting the seat belt.

Such seat belts are equipped to detect increasing and decreasing speed of a vehicle by measuring acceleration of the seat belt or acceleration speed of a vehicle using an electronic device. However, in such seat belt retractors, since winding force generated by a windup spring continuously exists on the seat belt while it is used, the belt wearers feel uncomfortable.

To ease the feeling of binding and to provide comfort for the belt wearer, a device designed to draw out the belt from the retractor as much as needed and fix its winding force has been proposed. Generally, such a winding force locking means performs the following functions.

The belt wearer feels that the belt is worn and then puts the locking means in operating order. However, the locking means operates before the wearer is finally seated so that the intended effect is not produced.

In order to solve such a problem, "a seat belt retractor provided with a winding force locking means," described in the U.S. Pat. No. 4,261,531 has been proposed.

The belt winding force locking means disclosed therein includes a locking means interlocked with the winding shaft means and a non-interlocked position non-interlocked with the winding shaft means. The winding force locking means when placed in the interlocked position prevents the winding of the seat belt from its wearing position. Winding of the belt in a predetermined range beyond its wearing position is drawn out. A first sensing means detects the wearing of the belt by its wearer and a second sensing means detects draw out of the belt after the belt wearer assumes a normal seated position while wearing the belt.

However, in such belt winding force locking means, in order to lock winding force, the first sensing means must function by operating a buckle which is a usual seat belt locking device and winding force must be locked by drawing out the seat belt again. In order to release the locked winding force, the buckle must be operated again. Thus, it is difficult to lock and release winding force every time while the wearer is seated. Furthermore, such locking means is complicated in construction and expensive to manufacture by comprising a first sensing means in which a ball is internally installed and a separate second sensing means, so that the seat belt directly connected with the safety of the wearer is apt to cause trouble.

Generally, the seat belt winding force control device has to meet the following requirements.

First, the seat belt is required to fulfill its function until a vehicle ceases to operate and its winding force control device has to be free from trouble nearly permanently.

Second, the winding force control device has to have a simple locking and releasing operation.

Third, the winding force control device has to have an accurate locking and releasing mechanism.

Fourth, the cost must not be increased by the addition of the winding force control means to the existing emergency braking means.

At present, however, no seat belt winding force control device which meets those requirements has been developed.

SUMMARY OF THE INVENTION

Accordingly, it is an object of the present invention to provide a winding force control device in which the seat belt winding force is correctly locked and released by snatching the seat belt.

Another object of the present invention is to provide a returning means which enables the seat belt to be drawn out and wound up within the limits required for small movements of a wearer at his seat belt wearing position.

A further object of the present invention is to enable the seat belt wearer to control the seat belt winding force.

Still another object of the present invention is to provide a seat belt winding control device which guarantees correct operation and is cheap to manufacture, due to simplified structure and function.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to a seat belt winding force controlling device for vehicles includes a main body, a belt reel, a shaft, a braking lever, a windup spring, an emergency braking member, a ratchet gear, and a winding force controlling member, whereby the winding force can be easily locked and released by snatching the belt, such that wearer does not feel confined.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a top plan view of the retractor having the seat belt winding force control device according to the present invention;

FIG. 3 is a sectional view of FIG. 2, taken along line 3—3;

FIG. 8 is a perspective view of the disassembled brake according to the present invention;

FIGS. 9 to 12 are sectional views of the brake according to the present invention showing the first, second, third, and fourth embodiments of the spring according to the present invention;

FIG. 13 is an enlarged front elevational view of the overlapping spring illustrated in FIG. 10;

Figure 21:
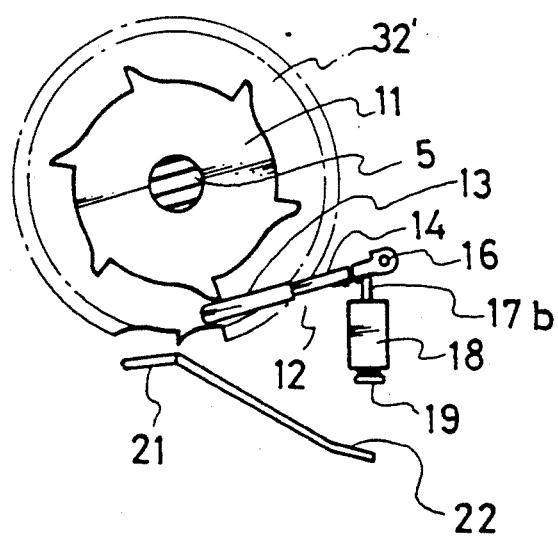

(B) shows the brake in contact with the ratchet gears for the first time; and (C) shows that seat belt winding force being controlled by the brake;

FIGS. 20(A) to 20(D) are a second embodiment of the winding force braking member according to the present invention, wherein (A) shows the brake in an inoperative condition;

(B) shows the brake in contact with the ratchet gears for the first time;

(C) shows the seat belt winding force being controlled by the brake; and (D) shows the condition of the brake when the belt is drawn out when in a condition in which the seat belt winding force is controlled by the brake; and FIG. 21 is a front elevational view of the second embodiment of the brake connection member illustrated in FIG. 11.

DESCRIPTION OF THE PREFERRED EMBODIMENTS

Figure 1:
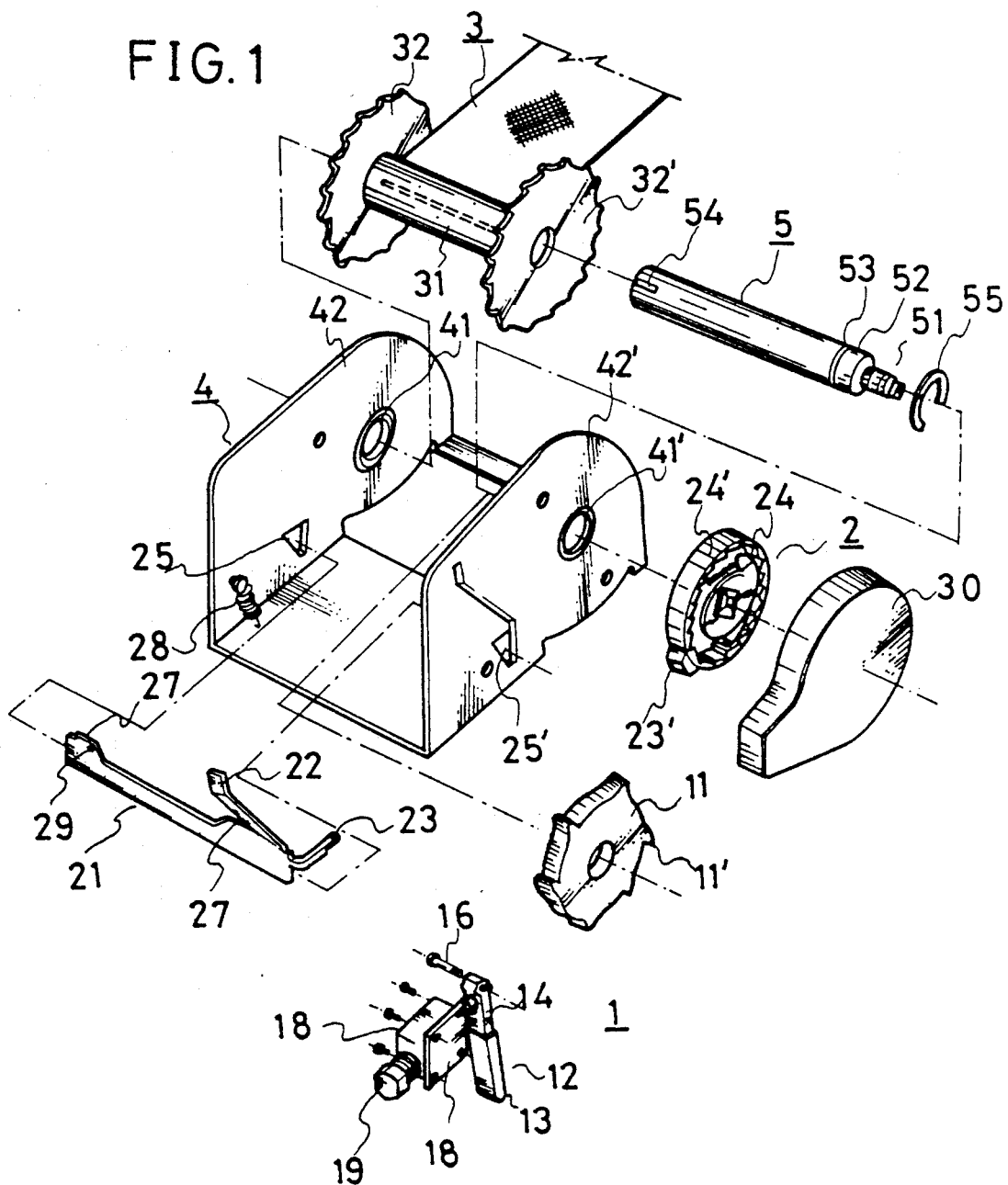
FIG. 1 is an exploded perspective view of the retractor having a seat belt winding force control device according to the present invention.
Figure 4A:
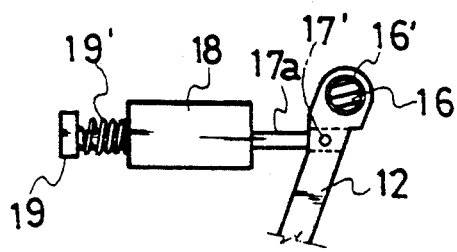
FIGS. 4(A) to 7(B) are front elevational views of first, second, third, and fourth embodiments of the brake connection member according to the present invention, respectively, wherein, (A) shows the brake in an inoperative condition; and (B) shows the brake in contact with the ratchet gear.
Figure 4B:
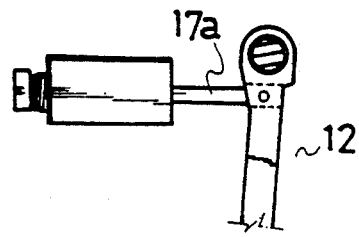

Referring now in detail to the drawings for the purpose of illustrating preferred embodiments of the present invention, the seat belt winding force control device for use in a vehicle as shown in FIGS. 1, 2, and 3, comprises a winding shaft 5 engaged with holes 41 and 41' which are disposed in a frame 42, 42' of a main body 4, a tubular belt reel 31 wound by a belt 3 and receiving the winding shaft 5, and ratchet gears 32 and 32' attached to both ends of the tubular belt reel 31.

At one end of the winding shaft 5, a windup spring 33 is formed on the outer wall of frame 42 with its end inserted into a slit 54 in winding shaft 5. An emergency braking member 2 is attached to the other end of the winding shaft 5. A braking latch 24 is fixedly attached to the winding shaft 5 and provided with a cover 30 for covering the emergency braking member 2. An internally toothed ratchet gear 24' of the emergency braking member 2 comes into intermittent contact with the braking latch 24. A braking lever 21 is formed across the frames 42 and 42' with its end inserted into braking lever sliding apertures 25 and 25' bored in the frames 42 and 42'. A connecting member 23 is formed at one end of the braking lever 21. When the connecting member 23 is inserted into a groove 23' disposed on the outer side of the toothed ratchet gear 24' of the emergency braking member 2, the braking lever 21 slides up or down in the sliding apertures 25 and 25' in accordance with the clockwise or counterclockwise rotation.

Thus, in case of an emergency, the braking latch 24 engages with the internally toothed ratchet gear 24', and the internally toothed ratchet gear 24' rotates rapidly. Accordingly, the connecting member 23 engaged with the ratchet gear 24' is pulled upward and latch surfaces 27 located on both ends of braking lever 21 engage with teeth of the ratchet gears 32 and 32', respectively, for emergency braking. When emergency braking is released, the braking lever 21 returns to its original position by being pulled out of contact with teeth of ratchet gears 32 and 32' via spring 28 which is connected to a hole 29 in braking lever 21 and to frame 42.

The seat belt 3 of the present invention provides a winding force control member 1 which relates to the emergency braking member 2 described hereinabove. The, winding force control member 1 includes a ratchet gear 11 fixed to one end 52 of the winding shaft 5. The latching direction of the ratchet gear 11 is contrary to that of the ratchet gears 32 and 32'. A brake 12 comes into intermittent contact with the ratchet gear 11. The brake 12 is movably attached to the inner side of the frame 42' disposed on one side of the main body 4. As shown in FIG. 8, the brake 12 includes a slide holder 13 for contacting with the ratchet gear 11, an accommodating member 14 inserted into the slide holder 13, and a pin hole 16' for receiving a pin 16. Pin 16 is fixed to the inner side of frame 42' as shown in FIG. 2. A spring 13' is disposed in the slide holder 13 and the accommodating member 14 with a catching member 14' which is resiliently formed in the slide holder 13.

As shown in FIG. 3, the brake 12 is operatively associated with a connector 17 connected to one end of a snapping switch member 18. Accordingly, since the brake 12 is operatively connected to the snapping switch 18 and can pivot turns about the pin 16, the brake 12 can be pivoted by pushing a button 19 on snapping switch 18. The snapping switch 18 is fixedly attached to the inner wall of the frame 42'. A button pushing member 22 extends from the braking lever 21 so as to push the button 19 when the braking lever operates. As shown in FIG. 1, the winding shaft 5 includes a braking lever fixing member 51, a halt ring insertion groove 53, and a halt ring 55.

The seat belt retractor according to the present invention operates as follows.

In an emergency, for example, when giving impact to the belt 3, or when the belt wearer snatches the belt 3 after slowly drawing it out from the belt reel 31 as much as needed or in the belt wearing condition, the braking latch 24 rotates quickly by engaging with the internally toothed ratchet gear 24'. Accordingly, the braking lever 21 stops further drawing out of the belt 3 by engaging with the ratchet gears 32 and 32'. At the same time, the button pushing member 22 formed in the braking lever 21 pushes the button 19. Accordingly, the brake 12 connected to switch 18 operates to contact the outer circumference of ratchet gear 11. Thereafter, the braking lever 21 returns to its original position as described above and, at the same time, the belt is rewound and the ratchet gear 11 turns around counterclockwise. By this turning force, the slide holder 13 of the brake 12 is pushed to its most retracted position, and the slide holder 13 comes to a stop in a condition in which the spring 13, in the slide holder 13 is compressed. At that moment, the ratchet gear 11 is brought to a stop in a condition in which the ratchet gear 11 is engaged with the brake 12 for the first time, and brake 12 is contacting ratchet gear 11 between two teeth of the ratchet gear. Therefore, counterclockwise rotation is not disturbed.

This retracting of slide holder 13 occurs during the first contact of ratchet gear 11 with the brake 12, which is also the time when the braking lever 21 can be returning to its original position for engaging with the ratchet gears 32 and 32'.

At the same time, the connector 17 continues to function by providing elastic force to make the brake 12 operate smoothly without separating from the ratchet gear 11.

The ratchet gear 11 can rotate without regard to the control of the brake 12 when the belt 3 is drawn out by pulling by hand, ratchet gear 11 can be adapted for drawing out and winding of the belt caused by small movements of the wearer when the belt 3 is worn, because the belt 3 can be drawn out so much as the length of a circular arc disposed between the teeth of ratchet gear 11 and still return to its original position. That is, the ratchet gear 11 under control turns clockwise when the belt 3 is slowly drawn out as shown in FIG. 20(C) since the brake 12 is pushed put of the way by the back of each tooth. When the belt ceases to be drawn out, the ratchet gear 11 and the brake 12 return to the contact position, and winding force is kept in a braked condition. In order to release the braked condition of winding force, the brake 12 has to be pulled quickly. When the belt 3 moves quickly, as by the wearer snatching the belt, the button pushing member 22 pushed again and the brake 12 returns to its original position separated from the ratchet gear 11.

Figure 19A:
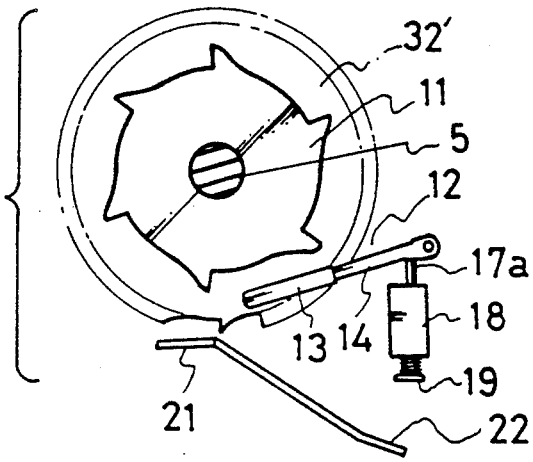
FIGS. 19(A) to 19(C) are a first embodiment of a winding force braking member according to the present invention, wherein, (A) shows the brake in an inoperative condition.
Figure 19B:
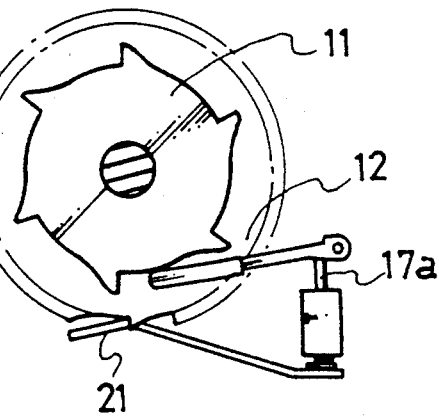
Figure 19C:
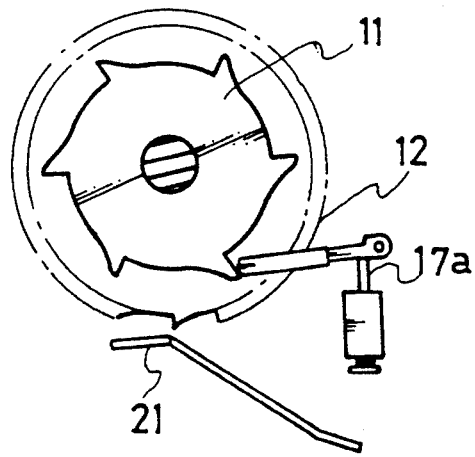

FIGS. 4 to 7 show the various embodiments of a connecting system between the snapping switch 18 and the brake 12. When the button pushing member 22 of braking lever 21 strikes the button 19 by operation of the braking lever 21, the brake 12 pivots about the pin 16, As shown in FIGS. 4(A) and 4(B), the first embodiment is formed by using an extending member 17a extending from the end of the snapping switch 18 as a connector and by connecting the extending member 17a with the surface adjacent to the pin 16 of brake 12. In FIG. 4(A) the snapping switch 18 is not activated and the brake 12 is not in contact with the ratchet gear 11, as shown in FIG. 19A. In FIG. 4(B) extending member 17a is extended and brake 12 is in contact with the ratchet gear 11, as shown in FIGS. 19B and 19C. In FIG. 19B, brake 12 contacts ratchet gear 11 between two of its teeth. In FIG. 19C, ratchet gear 11 has turned such that one of the teeth of ratchet gear 11 is in contact with brake 12, causing slide holder 13 of brake 12 to fully retract. This is the condition of controlled winding force. The numeral 16' is a lubricating mouth and 19' is a button returning spring.

Figure 5A:
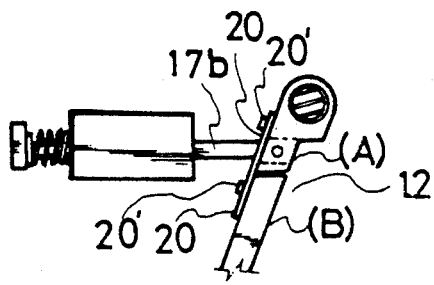
Figure 5B:
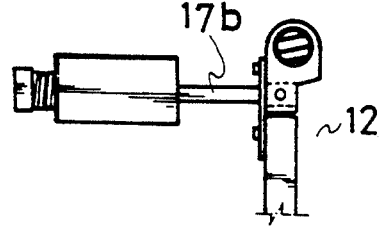

As shown in FIGS. 5(A) and 5(B), the second embodiment of the connecting system has an extending member 17b extending from end of the snapping switch 18. A plate spring 20 is associated with the extending member 17b. The brake 12 is separated into a connecting region (A) and a brake function part (B). The connecting region (A) is jointed to the extending member 17(B) by the plate spring 20. Reference numeral 20' indicates a plate spring fastener.

This second embodiment of the connecting system according to the present invention operates as shown in FIG. 21, such that when the back of a tooth of ratchet gear 11 pushes down on the brake 12, brake function part (B) can bend backward (FIG. 21).

Figure 6A:
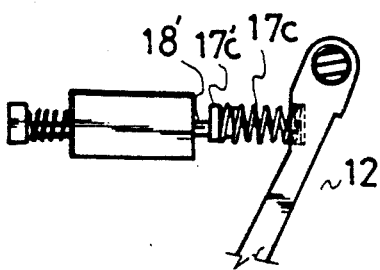
Figure 6B:
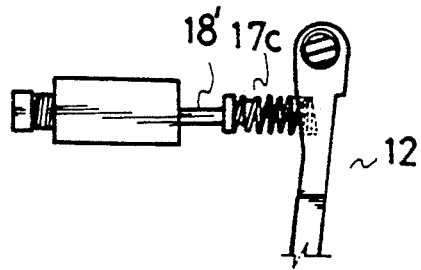

A third embodiment of the connection system according to the present invention, as shown in FIGS. 6(A) and 6(B) has a spring inserting member 17c' united with the end of a terminal 18' of the snapping switch 18. One end of a coil spring 17c is inserted into the spring inserting member 17c' and the opposite end of the coil spring 17c is used as a connector between the snapping switch 18 and brake 12 by attaching or depositing the opposite end of the coil spring 17c onto brake 12 below of the brake 12 the pin 16 of the brake 12.

Figure 20D:
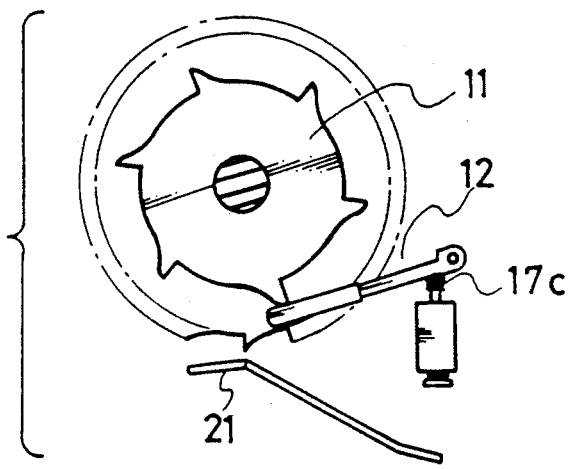

As shown in FIG. 20(A), the coil spring 17c supports the brake 12 in a condition in which the braking lever 21 is operating. The coil spring 17c holds its elastic force which is not affected by its own weight when the brake 12 is pushed and pulled. When the braking lever 21 operates and the button pushing member 22 pushes the button 19, the snapping switch 18 functions and advances the coil spring 17c. The brake 12 connected with the coil spring 17c pivots about the pin 16. Accordingly, the end of brake 12 comes into contact with the ratchet gear 11 between two teeth of the ratchet gear as shown in FIG. 20(B). FIG. 20(C) illustrates the controlled winding force condition when one tooth of ratchet gear 11 is in contact with brake 12, causing slide holder 13 of brake 12 to fully retract. FIG. 20(D) shows the condition when the belt 3 is drawn out during the controlled winding for condition in which braking is controlled. At this time, the belt 3 can be drawn out since the coil 17c is compressed and the brake 12 bends backward.

Figure 7A:
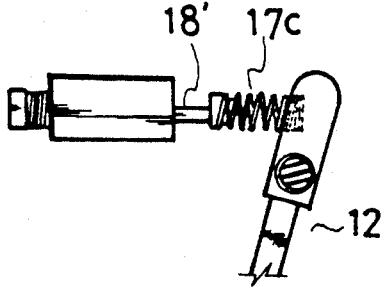
Figure 7B:
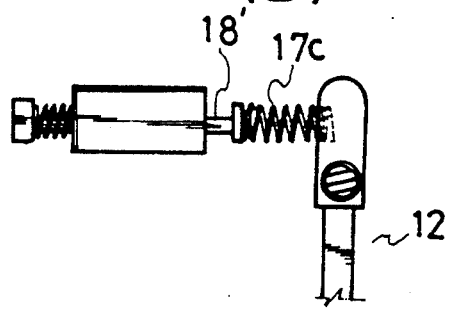

A fourth embodiment of the connecting system according to the present invention is shown in FIGS. 7(A) and 7(B), in which the coil spring 17c is used as a connector of the snapping switch 18 and brake 12, as in FIGS. 6(A) and 6(B), but the pin 16 is formed in the middle of brake 12 and the coil spring 17c is connected to brake 12 above pin 16.

FIGS. 9 to 12 illustrate the formation of the brake 12 sectionally and also four embodiments of spring 13'. As shown in FIGS. 9 and 10, the spring 13' is an overlapping spring. The overlapping spring as shown in FIG. 10 minimizes its fatigue caused by repeated motion by compressing through a compression part A (see FIG. 13). In the embodiment of FIG. 11, spring 13' comprises a coil spring. In the embodiment of FIG. 12, spring 13' comprises two coil springs.

Figure 14A:
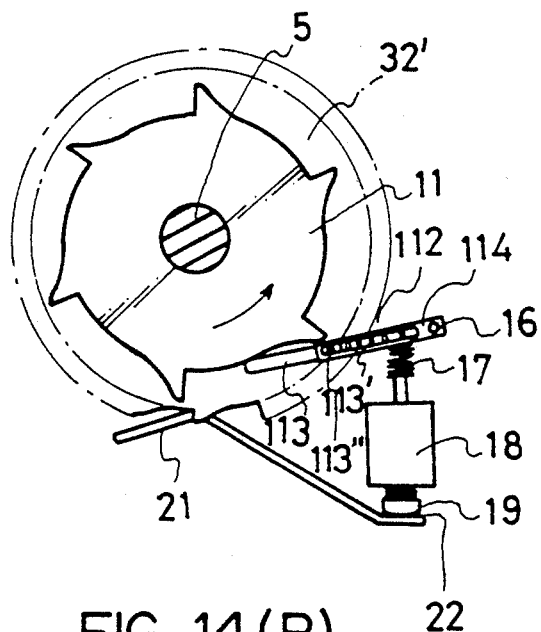
FIGS. 14(A) and 14(B) are front elevational views of the brake according to the present invention, wherein, (A) shows the brake in contact with the ratchet gears for the first time; and (B) shows the winding force of the belt being controlled by the brake.
Figure 14B:
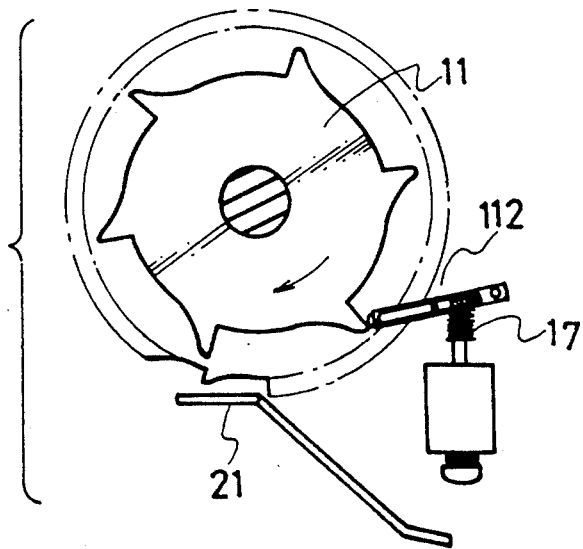

FIGS. 14(A) and 14(B) illustrate the another embodiment of the brake 12 according to the present invention, in which the brake 12 is formed in a condition in which a braking member 113 is strengthened within an accommodating holder 114 by a spring 113' and the braking member 113 is prevented from separating from the accommodating holder 114 by a pin 113''.

Also, FIG. 14(A) shows the condition in which brake 12 is in contact with the ratchet gear 11 the operation of the braking lever 21. When the ratchet gear 11 moves in the direction indicted by the arrow, the braking member 113 presses the spring 113' and the braking member 113 is retracted into the accommodating holder 114. The ratchet gear 11 ceases to rotate in the condition where the spring 113' is compressed as shown in FIG. 14(B). The braking lever 21 engages with the ratchet gears 32 and 32', while the braking member 113 retracts into the accommodating holder 114, and braking lever 21 returns to its original position by being pushed out of the way of the teeth of ratchet gear 32 and 32'.

Figure 15:
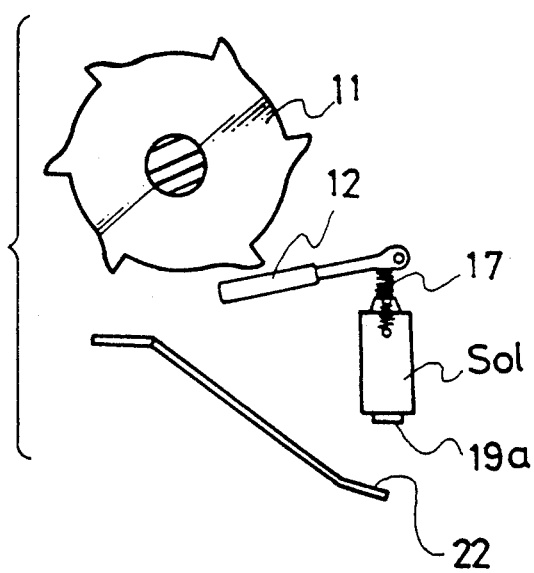
FIG. 15 is a front elevational view of the brake reciprocating member according to the present invention.

FIG. 15 shows another embodiment of the snapping switch 18 as a reciprocating means. When the button pushing member 22 formed in the braking lever 21 pushes a button 19a, power is supplied to a solenoid member Sol and the brake 12 comes into contact with the ratchet gear 11 by the operation of the solenoid member Sol. In case the winding force is released, the power supply is cut off when the belt is snapped again and the button 19a is pushed by the button pushing member 20 and the brake 12 returns to its original position.

FIGS. 16(A) to 18(B) illustrate three embodiments of a means for absorbing the striking power of the button pushing member 22 due to the operation of the braking lever 21. Such striking power absorbing means provides two effects described below.

First, the constituent elements of the button 19 and the snapping switch 18 may be damaged by the striking power of button pushing member 22 and button 19 can be protected by absorbing some striking power of the button pushing member 22.

Second, the button pushing member 22 operates simultaneously with the braking lever 21. Therefore, at the moment when the braking lever 21 finishes its engagement with the ratchet gears 32 and 32', the sphere of activity of button pushing member 22 is restricted. In order to enable the snapping switch 18 to function, movement by the striking power of the button pushing member 22 up to a predetermined line is required.

Therefore, the braking lever 21 and the button pushing member 22 have to be united so that the point in time when the braking lever 21 finishes its engagement with ratchet gears 32 and 32', corresponds with the point in time when the button pushing member 22 completes its activity to the extend that is required by the snapping switch 18.

In order to meet such requirements, precision is required when the device is manufactured. Otherwise, the device suffers from a problem by erroneous operation. Therefore, erroneous operation caused due to an error committed during manufacture is prevented by enabling the sphere of activity of button pushing member 22 to exceed in some degree the amount of end movement required primarily by the snapping switch 18. The excess striking power of the button pushing member 22 is absorbed in the button 19 and or in the button pushing member 22.

Figure 16A:
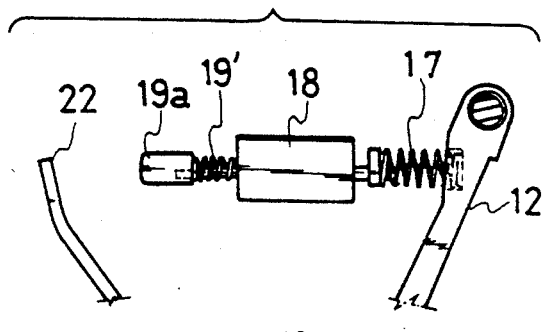
FIGS. 16(A) to 18(B) are front elevational views of first, second, and third embodiments of the striking power absorbing member when a button pressing member of a braking lever according to the present invention is operated, wherein, (A) shows the brake in an inoperative condition; and shows the brake in contact with a ratchet.
Figure 16B:
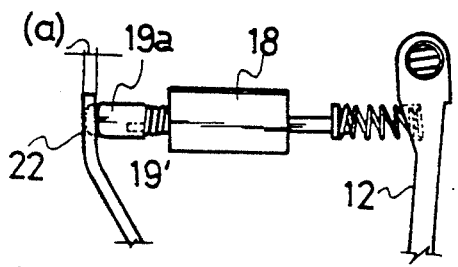

FIGS. 16(A) and 16(B) show the formation of a first embodiment of the button 19 according to the present invention. The excess power when a blow is given by the button pushing member 22 is absorbed in the button 19a by providing the button 19a with a striking 19' which absorbs the excess power. The button 19a connects to the snapping switch 18 as shown in FIG. 16(B) (dotted line).

Figure 17A:
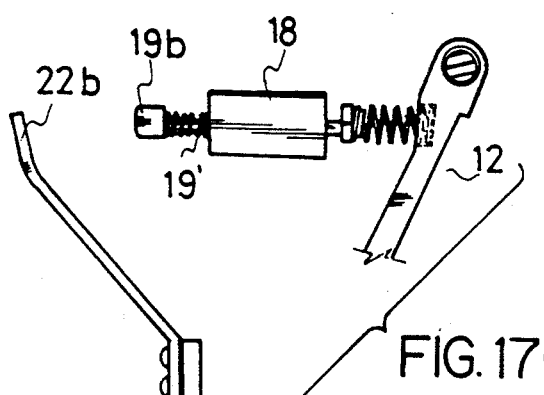
Figure 17B:
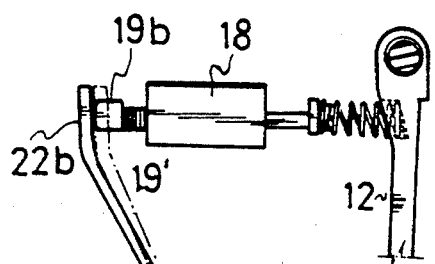

FIGS. 17(A) and 17(B) show a second embodiment in which the button pushing member 22b is provided with resilient quality. As shown in FIG. 17(B), the resilient button pushing member 22b absorbs the excess power when a blow is given by the button pushing member 22b. The button pushing member 22b completes the functioning of snapping switch 18 in a condition illustrated by a dotted line in FIG. 17(B). The resilient button pushing member 22b bends backward and absorbs the remaining power as illustrated by a solid line of FIG. 17(B).

Figure 18A:
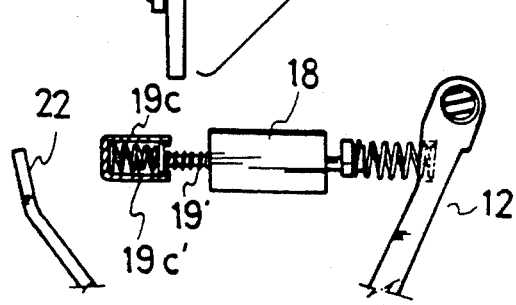
Figure 18B:
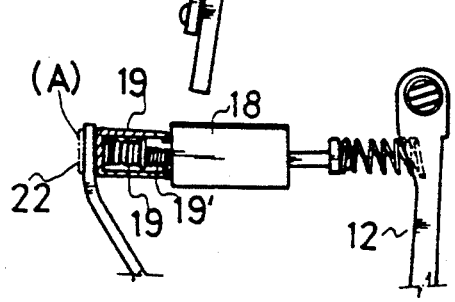

FIGS. 18(A) and 18(B) show the formation of third embodiment in which a spring 19c'is formed in the button 19. By selecting the elastic force of the spring to be greater than the force necessary to operate the snapping switch 18, the button 19c moves forward in some degree and completes the functioning of the snapping switch 18, and the excess force is absorbed by the button 19c. The snapping switch 18 completes its functioning at the location of button 19c illustrated by a dotted line of FIG. 18(B) and its excess force is absorbed by the button 19c.

The merits of the seat belt winding force control device according to the present invention as described hereinbefore are as follows:

First, the device can easily adjust seat belt winding force within the range where the wearer does not feel contfined.

Second, the wearer can conveniently adjust winding force because the device controls winding force in any part of the belt 3.

Third, when belt winding force braking is released by the device, the belt 3 performs the same role and function as seat belts heretofore in use.

Fourth, the device can control winding force or release it if the wearer holds the belt 3 and draws it out and then snatches it in a condition where it is held by hand. Such control and release is possible in any part of the belt 3 and the belt 3 can be used conveniently.

Fifth, even if the belt 3 is released to some extend when the wearer moves after desired winding force control is set, the belt to its originally set position within the given limits.

Sixth, when the wearer finds it necessary to extend the belt to a longer length after the winding force control is set, the belt 3 is reset at its desired length, only if is drawn out by weak force.

Seventh, the device commits no error in operation, enjoys nearly permanent life, operates without trouble, and is cheap to manufacture for the reason that it is provided with a simply functioning mechanism.

Eighth, the wearer does not feel confined and clothes are not crumpled if the wearer sets the control when he finds it fit.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. A seat belt winding force controlling device for use in a vehicle, which comprises:
   a main body having an U-shaped configuration defining a pair of side walls, said side walls provided with a pair of circular apertures and a pair of sliding apertures;
   a tubular belt reel having a pair of large ratchet gears attached to both ends thereof for winding a seat belt on said belt reel between said pair of ratchet gears;

a shaft engaging with said pair of circular apertures and inserted through said tubular belt reel, said shaft having a slit disposed at one end thereof;

a braking lever having a pair of latch surfaces disposed at both ends thereof for engaging with said pair of sliding aperture and for braking said pair of ratchet gears, said braking lever containing an U-shaped rod, said U-shaped rod having a button pushing member at one end and a connecting member at its other end;

a windup spring having an outside end attached to an outer surface of one side wall of said main body, and having an inside end attached to said slit of said shaft;

an emergency braking means movably attached to an outer surface of the other side wall of said main body and fixedly attached to said shaft, said emergency braking means including an internally toothed ratchet gear, a braking latch, and a groove disposed on an outer surface of said toothed ratchet gear for receiving said connecting member of the U-shaped rod;

a single small ratchet gear disposed between one of said large ratchet gears and one of said side walls adjacent to said emergency braking means, said single small ratchet gear fixed to said shaft and having a latching direction contrary to that of said pair of large ratchet gears; and a winding force controlling means operatively associated with said single small ratchet gear, said winding force controlling means including a brake pivotably attached to a pin fixed on one of said side walls of the main body, a snapping switch member with a button member disposed at one end thereof for being operatively pushed by said button pushing member of the U-shaped rod and a connector disposed at another end of said snapping switch member for operatively pushing said brake so as to lock said single small ratchet gear, whereby in an emergency state, when a wearer gives impact to said seat belt, said toothed ratchet gear rotates in a counterclockwise direction such that said latch surfaces of the braking lever contact said pair of large ratchet gears, and simultaneously said button pushing member of the U-shaped rod pushes said button member of the snapping member such that said brake engages with said single small ratchet gear.

2. The seat belt retracting device of claim 1, wherein said main body is provided with a spring biased member attached to an inside surface of one of said side walls, such that said braking lever is returned to its original position.

3. The seat belt retracting device of claim 1, wherein said button member has a small spring and the said connector is an extending rod.

4. The seat belt retracting device of claim 1, wherein said button member has a small spring and said connector is an extending member with a plate spring attached thereto.

5. The seat belt retracting device of claim 1, wherein said button member has a small spring and said connector comprises a terminal attached to a spring inserting member, with a coil spring attached to said spring inserting member.

6. The seat belt retracting device of claim 5, wherein said first coil spring of the connector contacts said brake at a point above said pin which pivotally fixes said brake to said side wall of the main body.

7. The seat belt retracting device of claim 1, wherein said brake comprises an accommodating member having a locking member, and a hollow slide holder containing biasing means for slidably receiving said locking member.

8. The seat belt retracting device of claim 7, wherein said biasing means is an overlapping spring.

9. The seat belt retracting device of claim 8, wherein said overlapping spring has a compression part.

10. The seat belt retracting device of claim 7, wherein said biasing means is a coil spring.

11. The seat belt retracting device of claim 7, wherein said biasing means is a plurality of coil springs.

12. The seat belt retracting device of claim 1, wherein said snapping switch member comprises a solenoid.

13. The seat belt retracting device of claim 1, wherein said button m ember is made of a striking power absorbable resilient material.

14. The seat belt retracting device of claim 13, wherein said button member has a spring inserted inside.

15. The seat belt retracting device of claim 13, wherein said button pushing member is made of a striking power absorbable resilient material.

* * * * *